(12) United States Patent
Nagashima et al.

(10) Patent No.: US 7,933,776 B2
(45) Date of Patent: Apr. 26, 2011

(54) DEVICE CONTROLLER PROMPTING FOR COMPLETE OR ONE-BY-ONE SPEECH INPUT BASED ON USER'S SKILL LEVEL

(75) Inventors: Hisayuki Nagashima, Wako (JP); Masashi Satomura, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 560 days.

(21) Appl. No.: 11/544,626

(22) Filed: Oct. 10, 2006

(65) Prior Publication Data
US 2007/0094033 A1 Apr. 26, 2007

(30) Foreign Application Priority Data
Oct. 20, 2005 (JP) ................................. 2005-305684

(51) Int. Cl.
*G10L 11/00* (2006.01)
(52) U.S. Cl. ......... 704/270; 704/272; 704/275; 704/251
(58) Field of Classification Search .................. 704/270, 704/272, 275, 251; 340/576; 434/169, 335, 434/353
See application file for complete search history.

(56) References Cited

U.S. PATENT DOCUMENTS

| | | | | |
|---|---|---|---|---|
| 3,943,295 | A * | 3/1976 | Martin et al. | 704/253 |
| 4,049,913 | A * | 9/1977 | Sakoe | 704/241 |
| 4,227,176 | A * | 10/1980 | Moshier | 704/231 |
| 5,425,129 | A * | 6/1995 | Garman et al. | 704/256 |
| 6,560,576 | B1 * | 5/2003 | Cohen et al. | 704/270 |
| 6,944,592 | B1 * | 9/2005 | Pickering | 704/251 |
| 7,024,366 | B1 * | 4/2006 | Deyoe et al. | 704/270.1 |
| 7,050,976 | B1 * | 5/2006 | Packingham | 704/270 |
| 7,313,526 | B2 * | 12/2007 | Roth et al. | 704/270 |
| 7,573,986 | B2 * | 8/2009 | Balentine et al. | 379/76 |
| 2002/0147593 | A1 * | 10/2002 | Lewis et al. | 704/275 |
| 2004/0179659 | A1 * | 9/2004 | Byrne et al. | 379/88.18 |

(Continued)

FOREIGN PATENT DOCUMENTS
DE 100 35 869 A1 1/2002
(Continued)

*Primary Examiner* — Talivaldis I Smits
*Assistant Examiner* — Shaun Roberts
(74) *Attorney, Agent, or Firm* — ArentFox LLP

(57) ABSTRACT

A speech recognition device controller is provided, which is capable of properly determining a user's leaning level in speech so as to provide an efficient interaction. It includes a voice input unit 2 for receiving speech input from a user, a speech recognition unit 3 for recognizing the input speech, a response output unit 10 for outputting a response to the user, and a device control unit 11 for controlling a device based on a recognition result of the speech recognition unit 3. It further includes an input item count detection unit 4 for detecting the number of items identified from the recognized speech among a given number of items necessary to control the device, a reference input item count setting unit 6 for setting a reference value for the number of items identified from the speech, an input item count comparison unit 7 for comparing the number of items detected by the input item count detection unit 4 with the reference value set by the reference input item count setting unit 6, a skill level determination unit 8 for determining the user's skill level in speech based on a comparison result, and a response control unit 9 for controlling the response output according to the determined skill level, wherein the user is prompted to enter a complete one-time speech input or a one-by-one series of discrete speech inputs, based upon the determined skill level.

20 Claims, 8 Drawing Sheets

U.S. PATENT DOCUMENTS

2004/0252027 A1* 12/2004 Torkkola et al. .............. 340/576
2005/0177374 A1* 8/2005 Cooper et al. ................. 704/275
2007/0038461 A1* 2/2007 Abbott et al. ................. 704/275

FOREIGN PATENT DOCUMENTS

| DE | 100 46 359 A1 | 3/2002 |
| DE | 699 00 981 T2 | 8/2002 |
| DE | 101 10 977 C1 | 10/2002 |
| DE | 698 10 819 T2 | 11/2003 |
| DE | 103 42 541 A1 | 2/2005 |
| DE | 103 48 408 A1 | 5/2005 |
| JP | 2000-194386 A | 7/2000 |
| WO | WO 2005/008627 A1 | 1/2005 |

\* cited by examiner

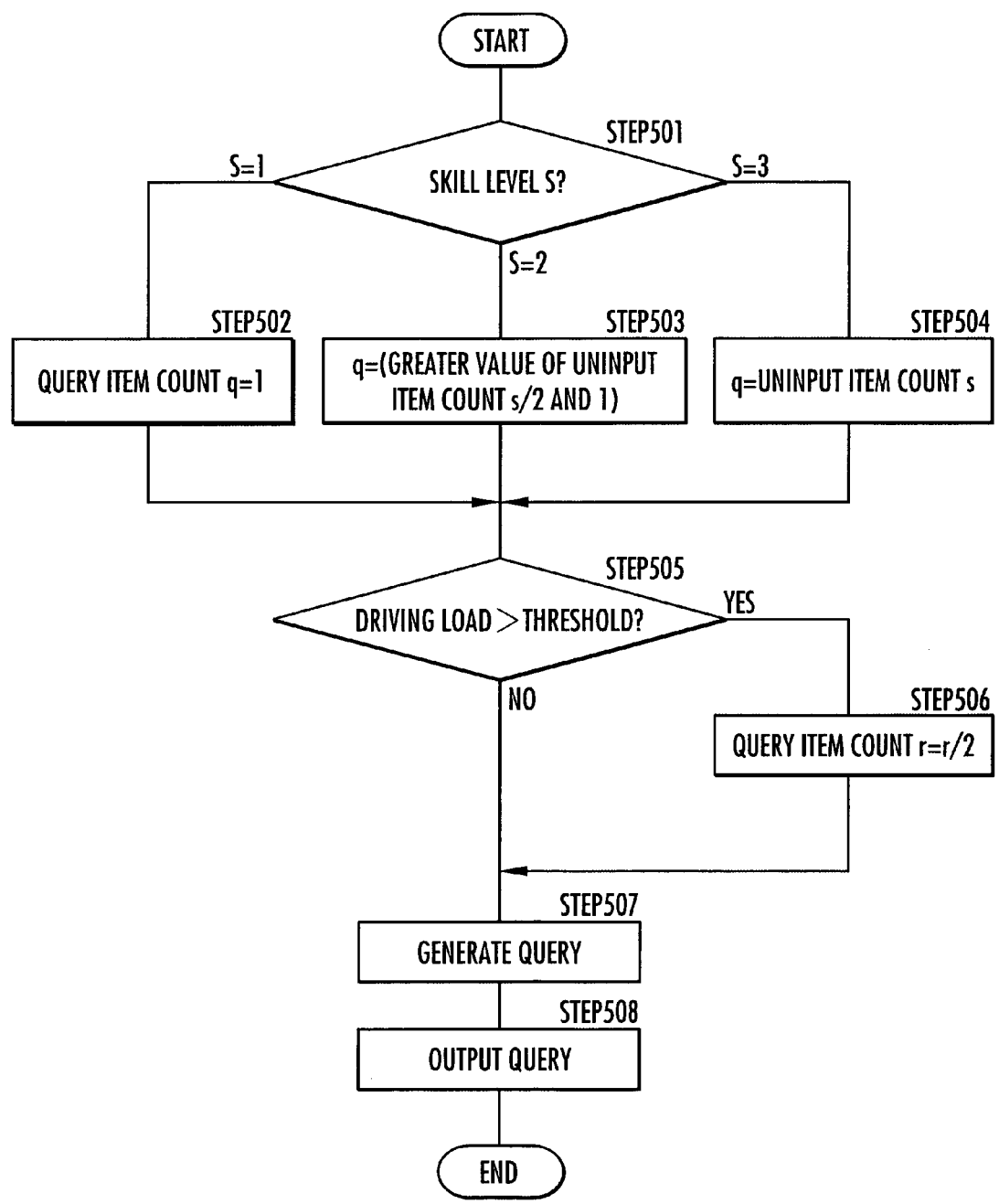

FIG.8

(a)
DRIVER: "PLAY A CD"
DEVICE: "PLEASE INPUT THE CD NAME OR ARTIST NAME AND THE TRACK NUMBER."
DRIVER: "PLAY THE HONDA CD FROM THE BEGINNING."
DEVICE: "THEN, I'LL PLAY THE HONDA CD FROM THE BEGINNING."

(b)
DRIVER: "SEARCH FOR A CONVENIENCE STORE."
DEVICE: "PLEASE INPUT THE TYPE OF THE CONVENIENCE STORE AND ADDITIONAL SEARCH CONDITIONS."
DRIVER: "ANY NEAREST ONE."
DEVICE: "THEN, I'LL SHOW YOU THE WAY TO THE NEAREST HONDA-MART STORE."

(c)
DRIVER: "I WANT TO LISTEN TO MUSIC."
DEVICE: "PLEASE SELECT THE DEVICE SUCH AS CD, DVD, OR RADIO."
DRIVER: "PLAY THE HONDA CD."
DEVICE: "PLEASE INPUT THE TRACK NUMBER."
DRIVER: "FROM THE BEGINNING."
DEVICE: "THEN, I'LL PLAY THE HONDA CD FROM THE BEGINNING."

DEVICE CONTROLLER PROMPTING FOR COMPLETE OR ONE-BY-ONE SPEECH INPUT BASED ON USER'S SKILL LEVEL

TECHNICAL FIELD

The present invention relates to a speech recognition device controller for recognizing a voice input from a user, interacting with the user by responding to the user based on the recognized result, and acquiring information for controlling the device.

BACKGROUND ART

In recent years, for example, in a system by which a user purchases goods, operates a device, or the like, there has been used a speech (hereafter "voice") recognition device controller for recognizing a voice input from the user and acquiring information necessary for purchasing goods, operating the device, or the like. This kind of the voice recognition device controller interacts with the user by recognizing a voice (speech) input from the user, responding (outputting a voice guide) to the user based on the recognized result to prompt the user for the next speech. Thereafter, the voice recognition device controller acquires necessary information for goods purchase, device operation, or the like from the recognized result of the interaction with the user.

If a voice guide or interactive flow is fixed independently of a user or a user's situation in this kind of voice recognition device controller, an efficient interaction cannot be achieved in some cases. For example, a voice guide tailored to a user, who is unfamiliar with speech to the voice recognition device controller, is redundant for a user familiar with speech to the voice recognition device controller. Therefore, the system using the voice recognition device controller fixed to this type of voice guide is inconvenient to use for the user familiar with speech. Accordingly, there is already suggested a voice recognition device controller for determining a user's learning level in speech and changing a response to the user based on a determination result (refer to, for example, Japanese Patent Laid-Open No. 2000-194386 (hereinafter, referred to as Patent Document 1)).

A voice recognition/response system, which is the voice recognition device controller in the Patent Document 1, recognizes speech input from a user via a telephone and responds to the user. If the voice recognition/response system is applied to, for example, a telephone-based airline reservation system, it acquires the airport names of departure and destination, the date and time of departure, and the like from a telephone interaction with a user by voice recognition.

In this case, the voice recognition/response system includes a learning level determination unit for determining a user's learning level in speech and a speech control unit for controlling an interactive flow (the content of a voice guide and a rate of speech of the voice guide) with the user based on the determination result of the learning level determination unit. The learning level determination unit determines that the learning level is higher as time A and time T become shorter and the number of speech sounds N becomes lower and that the learning level is lower as the time A and the time T become longer and the number of speech sounds N becomes greater, where A is a time period from the start of outputting the voice guide to the start of the user's speech, T is a time period for the user's speech, and N is the number of user's speech sounds (the number of user's speech words). Then, the speech control unit gives a brief and short voice guide at a high speed if the user's learning level is relatively high and gives a detailed voice guide at a low speed if the user's learning level is relatively low by using the content of the voice guide and the rate of speech determined based on the determination result of the learning level determination unit.

The speech tendency such as the speech time and the number of speech sounds also depends upon the user's individual preferences. Therefore, a long speech time and a great number of speech sounds do not necessarily imply a low learning level in speech. For example, even if the rate of speech is low, the user's learning level in speech can be considered to be high in the case where all of necessary information is input without fail. Therefore, if the user's learning level in speech is determined based on the speech time or the number of speech sounds as in the voice recognition/response system disclosed in the Patent Document 1, the learning level cannot be properly determined and it may lead to a problem of causing an inefficient interaction in some cases.

DISCLOSURE OF THE INVENTION

It is an object of the present invention to resolve the above problem and to provide a voice recognition device controller capable of properly determining a user's learning level in speech so as to provide an efficient interaction.

According to one aspect of the present invention, there is provided a voice recognition device controller having a voice input unit for receiving speech input from a user, a voice recognition unit for recognizing the speech input to the voice input unit, a response output unit for outputting a response to the user, and a device control unit for controlling a device based on the recognition result of the voice recognition unit, the voice recognition device controller comprising: an input item count detection unit for detecting the number of items identified from the speech recognized by the voice recognition unit among a given number of items necessary to control the device; a reference input item count setting unit for setting a reference value for the number of items identified from the speech based on the content of the input speech; an input item count comparison unit for comparing the number of items detected by the input item count detection unit with the reference value for the number of items set by the reference input item count setting unit; a learning level determination unit for determining a learning level in speech of the user based on a comparison result of the input item count comparison unit; and a response control unit for controlling the response output from the response output unit according to the learning level determined by the learning level determination unit (a first aspect of the invention).

According to the voice recognition device controller according to the first aspect of the invention, the input item count detection unit detects the number of items identified from the speech recognized by the voice recognition unit among the given number of items necessary to control the device. Note here that items necessary to control the device includes, for example, a controlled object (device type), a controlled content for each controlled object, and a parameter for each controlled content. The number of necessary items is then a given number previously determined according to the controlled object and the controlled content. The reference input item count setting unit sets the reference value for the number of items identified from the speech based on the content of the input speech. As the reference value, it is possible to use, for example, a given value previously determined as the number of items identified from typical user's speech.

If the user is familiar with the speech for controlling the device, it is considered that the user can input more items with one-time speech. Therefore, the learning level determination unit determines the user's learning level in speech based on the comparison result of the input item count comparison unit. Thus, the user's learning level in speech is determined according to the number of items that can be input with one-time speech. Therefore, the user's learning level in speech for controlling the device is properly determined independently of the tendency of the user's speech such as the rate of speech or the number of speech sounds. Thereafter, the response control unit controls the response output from the response output unit according to the learning level determined by the learning level determination unit. According to the present invention, the user is prompted for the next speech by the output of the response controlled as described above, by which an efficient interaction is achieved.

Moreover, in the voice recognition device controller according to the first aspect of the invention, preferably it further includes a learning level storage unit for updatably storing a user's temporary learning level in speech, and the reference input item count setting unit sets the reference value for the number of items identified from the speech based on the user's temporary learning level in speech stored by the learning level storage unit (a second aspect of the invention).

According to the second aspect of the invention, the learning level storage unit updatably stores the user's temporary learning level in speech. As the user's temporary learning level in speech, it is possible to use, for example, a given value previously determined by the user or a given value set based on the learning level determined from user's past speech. Then, the reference input item count setting unit sets the reference value for the number of items identified from the speech, based on the user's temporary learning level in speech stored in the learning level storage unit. Therefore, the reference value is set based on the temporary learning level and the learning level is determined as a result of the comparison with the reference value, by which the current learning level can be relatively determined to the temporary learning level. Thereby, the current learning level can be determined, for example, with the tendency of the user's learning level in the past speech more reflected therein.

Furthermore, if there are a plurality of types for the device in the voice recognition device controller according to the second aspect of the invention, preferably, the learning level storage unit stores the user's temporary learning level in speech for each type of device, the reference input item count setting unit sets the reference value for the number of items identified from the speech for each type of device, the input item count comparison unit compares the number of items detected by the input item count detection unit with the reference value for the number of items set for each type of device, and the learning level determination unit determines the user's learning level in speech for each type of device, based on the comparison result of the input item count comparison unit (a third aspect of the invention).

More specifically, if there are a plurality of types for the device, the type of a frequently used device depends upon the user and therefore the learning level can be considered to depend upon the device type. In this situation, the learning level storage unit stores the user's temporary learning level in speech for each type of device and the reference input item count setting unit sets the reference value for the number of items identified from the speech for each type of device. The input item count comparison unit compares the number of items detected by the input item count detection unit with the reference value for the number of items set for each type of device. Thereafter, the input item count comparison unit compares the number of items detected by the input item count detection unit with the reference value for the number of items set for each type of device. Therefore, the learning level determination unit determines the user's learning level in speech for each type of device. Consequently, for example, even if there are a plurality of types for the device and the user's learning level in speech depends upon the device type, the user's learning level in speech for each device can be properly determined.

Furthermore, if a plurality of the types of devices are each provided with a plurality of types of operational objects that can be operated by the user, and the given number of items necessary to control the device include items necessary to operate the operational objects in the voice recognition device controller according to the third aspect of the invention, preferably, the learning level storage unit stores the user's temporary learning level in speech for each type of device and for each type of operational object, the reference input item count setting unit sets the reference value for the number of items identified from the speech for each type of device and for each type of operational object, the input item count comparison unit compares the number of items detected by the input item count detection unit with the reference value for the number of items set for each type of device and for each type of operational object, and the learning level determination unit determines the user's learning level in speech for each type of device and for each type of operational object based on the comparison result of the input item count comparison unit (a fourth aspect of the invention).

More specifically, if a plurality of the types of devices are each provided with a plurality of the types of operational objects that can be operated by the user, the given number of items necessary to control the device include the items necessary to operate the operational objects and the item depends upon each operational object. In this case, the frequently used devices vary among users and further the frequently used operational objects vary among devices, and thus the learning levels can be considered to vary among types of devices and types of operational objects.

In this condition, the learning level storage unit stores the user's temporary learning level in speech for each type of device and for each type of operational object and the reference input item count setting unit sets the reference value for the number of items identified from the speech for each type of device and for each type of operational object. Thereafter, the input item count comparison unit compares the number of items detected by the input item count detection unit with the reference value for the number of items set for each type of device and for each type of operational object. Therefore, the learning level determination unit determines the user's learning level in speech for each type of device and for each type of operational object. Consequently, for example, even if a plurality of the types of devices are each provided with a plurality of the types of operational objects that can be operated by the user, and the user's learning level depends upon the type of device and the type of operational object, the user's learning level in speech can be properly determined for each device and for each operational object.

Furthermore, in the voice recognition device controller according to the second to fourth aspects of the invention, preferably the learning level storage unit updates the user's temporary learning level in speech stored in the learning level storage unit on the basis of a determination result of the learning level determination unit (a fifth aspect of the invention).

According to the fifth aspect of the invention, the learning level storage unit updates the user's temporary learning level in speech stored in the learning level storage unit on the basis of the determination result of the learning level determination unit. In this condition, if the learning level determination unit determines the user's learning level in speech for each type of device, the learning level storage unit updates the user's temporary learning level in speech stored for each type of device. If the learning level determination unit determines the user's learning level in speech for each type of device and for each type of operational object, the learning level storage unit updates the user's temporary learning level in speech stored for each type of device and for each type of operational object. Thereby, the reference value for determining the learning level is set based on the appropriately updated temporary learning level, and therefore the current learning level is determined more properly.

Furthermore, if there are a lot of necessary items and a variety of responses (inquiries) are output from the response output unit in the above, the user's learning level can be considered to vary with the inquiry content. For example, the learning level varies with the progress of the interaction in some cases, because the user is familiar with some inquiries or unfamiliar with other inquires. For this, according to present invention, the temporary learning level is appropriately updated, the reference value is set based on the temporary learning level, and the learning level is determined by the comparison with the reference value. Therefore, the user's learning level in speech is properly determined even if it varies during the interaction.

Furthermore, in the voice recognition device controller according to the first to fifth aspects of the invention, preferably the response control unit includes a unit for controlling a response in such a way as to prompt the user for a given number of items, with the given number set according to the learning level determined by the learning level determination unit, among items not identified from the speech recognized by the voice recognition unit, if any, among the given number of items necessary to control the device (a sixth aspect of the invention).

According to the sixth aspect of the invention, if there are any items not identified from the speech, which is recognized by the voice recognition unit, among the given number of items necessary to control the device, the unidentified items need be input through the subsequent interaction with the user. Consequently, the response output unit outputs a response (voice guide) to prompt the user to input the unidentified items. In this output, the response control unit controls the response in such a way as to prompt the user to input the given number of items, with the given number set according to the learning level determined by the learning level determination unit, among the unidentified items. For example, the response control unit sets the given number to a greater value as the learning level becomes higher.

If there are a plurality of types of devices and the user's learning level in speech is determined for each type of device, the given number of items necessary to control the device are those determined for each type of device. If a plurality of the types of devices are each provided with a plurality of the types of operational objects that can be operated by the user and the user's learning level in speech is determined for each type of device and for each type of operational object, the given number of items necessary to control the device are those determined for each type of device and for each type of operational object.

Thereby, for example, if the user is familiar with speech for controlling the device and can input many items with one-time speech, a voice guide is output in such a way as to prompt the user to input many items. On the other hand, if the user is unfamiliar with speech for controlling the device and cannot input many items with one-time speech, a voice guide is output in such a way as to prompt the user to input items one by one. Therefore, according to present invention, an appropriate response is output from the response output unit with consideration given to the user's learning level in speech, by which an efficient interaction is performed.

The voice recognition device controller according to the present invention is mounted on a movable body such as a vehicle and used by a driver of the movable body to control a device. In this situation, during driving a vehicle, for example, the degree that the driver needs to concentrate on driving depends upon a driving load on the driver caused by vehicle running condition or the like. Therefore, if the voice recognition device controller according to the present invention is mounted on a movable body, preferably it further includes a driving load detection unit for detecting a driving load on the user who is the driver of the movable body and the reference input item count setting unit sets the reference value for the number of items identified from the speech based on the content of the input speech and the driving load detected by the driving load detection unit. Particularly, if the voice recognition device controller includes the learning level storage unit, preferably it further includes a driving load detection unit for detecting a driving load on the user who is the driver of the movable body and the reference input item count setting unit sets the reference value for the number of items identified from the speech based on the user's temporary learning level in speech stored by the learning level storage unit according to the type of the content of the input speech and the driving load detected by the driving load detection unit (a seventh aspect of the invention).

According to the above, the driving load detection unit detects the driving load on the user as the driver of the movable body. For example, in the case of a vehicle, the driving load can be detected from a vehicle speed, a steering operation, a brake operation, perspiration on the palm of a hand, or the like. Moreover, for example, if the driving load is high, the user needs to highly concentrate on driving, and therefore it is considered that the user less concentrates on controlling the device and can input fewer items with one-time speech in comparison with those input when the driving load is low. If the learning level is determined then based on a result of comparison with the same reference value as one set when the driving load is low, the user's learning level in speech might be determined lower than the actual learning level.

For this problem, the reference input item count setting unit sets the reference value for the number of items identified from the speech on the basis of the driving load detected by the driving load detection unit in addition to the content of the user's speech and the user's temporary learning level in speech stored in the learning level storage unit. This enables setting of the reference value with consideration given to the driving load on the user as the driver, and therefore the actual user's learning level in speech is properly determined even during driving.

If the user's temporary learning level in speech is stored for each type of device, the reference value for the number of items identified from the speech is set for each type of device and therefore the user's learning level in speech is determined for each type of device. If the user's temporary learning level in speech is stored for each type of device and for each type of operational object, the reference value for the number of items identified from the speech is set for each type of device and for each type of operational object, and therefore the user's learning level in speech is determined for each type of device and for each type of operational object.

Moreover, if the voice recognition device controller according to the present invention includes the driving load detection unit (the seventh aspect of the invention), preferably the response control unit includes a unit for controlling a response in such a way as to prompt the user for a given number of items, with the given number set according to the learning level determined by the learning level determination unit and the driving load detected by the driving load detection unit, among items not identified from the speech recognized by the voice recognition unit, if any, among the given number of items necessary to control the device (an eighth aspect of the invention).

According to the above, if there are any items that not identified from the speech, which is recognized by the voice recognition unit, among the given number of items necessary to control the device, the unidentified items need be input through the subsequent interaction with the user. Consequently, the response output unit outputs a response (voice guide) to prompt the user to input the unidentified items. In this output, the response control unit controls the response in such a way as to prompt the user to input the given number of items, with the given number set according to the learning level determined by the learning level determination unit and the driving load detected by the driving load detection unit, among the unidentified items. For example, the response control unit sets the given number to a greater value as the learning level becomes higher and sets the given number to a relatively low value as the driving load becomes higher.

If there are a plurality of types of devices and the user's learning level in speech is determined for each type of device, the given number of items necessary to control the device are those determined for each type of device. Moreover, if a plurality of the types of devices are each provided with a plurality of types of operational objects that can be operated by the user and the user's learning level in speech is determined for each type of device and for each type of operational object, the given number of items necessary to control the device are those determined for each type of device and for each type of operational object.

Thereby, for example, if the user is familiar with speech for controlling the device and can input many items with one-time speech, a voice guide is output in such a way as to prompt the user to input many items. On the other hand, if the user is unfamiliar with speech for controlling the device and cannot input many items with one-time speech, a voice guide is output in such a way as to prompt the user to input items one by one. Furthermore, for example, if the driving load is high and the user needs to highly concentrate on driving and less concentrates on controlling the device, a voice guide is output in such a way as to prompt the user to input less items than those input when the driving load is low. Therefore, according to present invention, an appropriate response is output from the response output unit with consideration given to the user's learning level in speech and to the driving load on the user, by which an efficient interaction is performed.

BRIEF DESCRIPTION OF THE DRAWINGS

FIG. 2 to FIG. 7 are flowcharts of device control processing by voice recognition in the voice recognition device controller shown in FIG. 1.

FIG. 8 is an example of an interaction in the voice recognition device controller shown in FIG. 1.

More specifically, FIG. 2 is a flowchart showing a general operation (voice recognition device control processing) in the voice recognition device controller shown in FIG. 1. FIG. 3 is a flowchart showing processing for analyzing an input statement in the voice recognition device control processing shown in FIG. 2. FIG. 4 is a flowchart showing processing for reading a temporary skill level in the voice recognition device control processing shown in FIG. 2. FIG. 5 is a flowchart showing processing for setting the number of reference input items in the voice recognition device control processing shown in FIG. 2. FIG. 6 is a flowchart showing processing for determining a skill level in the voice recognition device control processing shown in FIG. 2. FIG. 7 is a flowchart showing processing for determining a query in the voice recognition device control processing shown in FIG. 2.

BEST MODE FOR CARRYING OUT THE INVENTION

One embodiment of the present invention will be described below with reference to the accompanying drawings.

Figure 1:
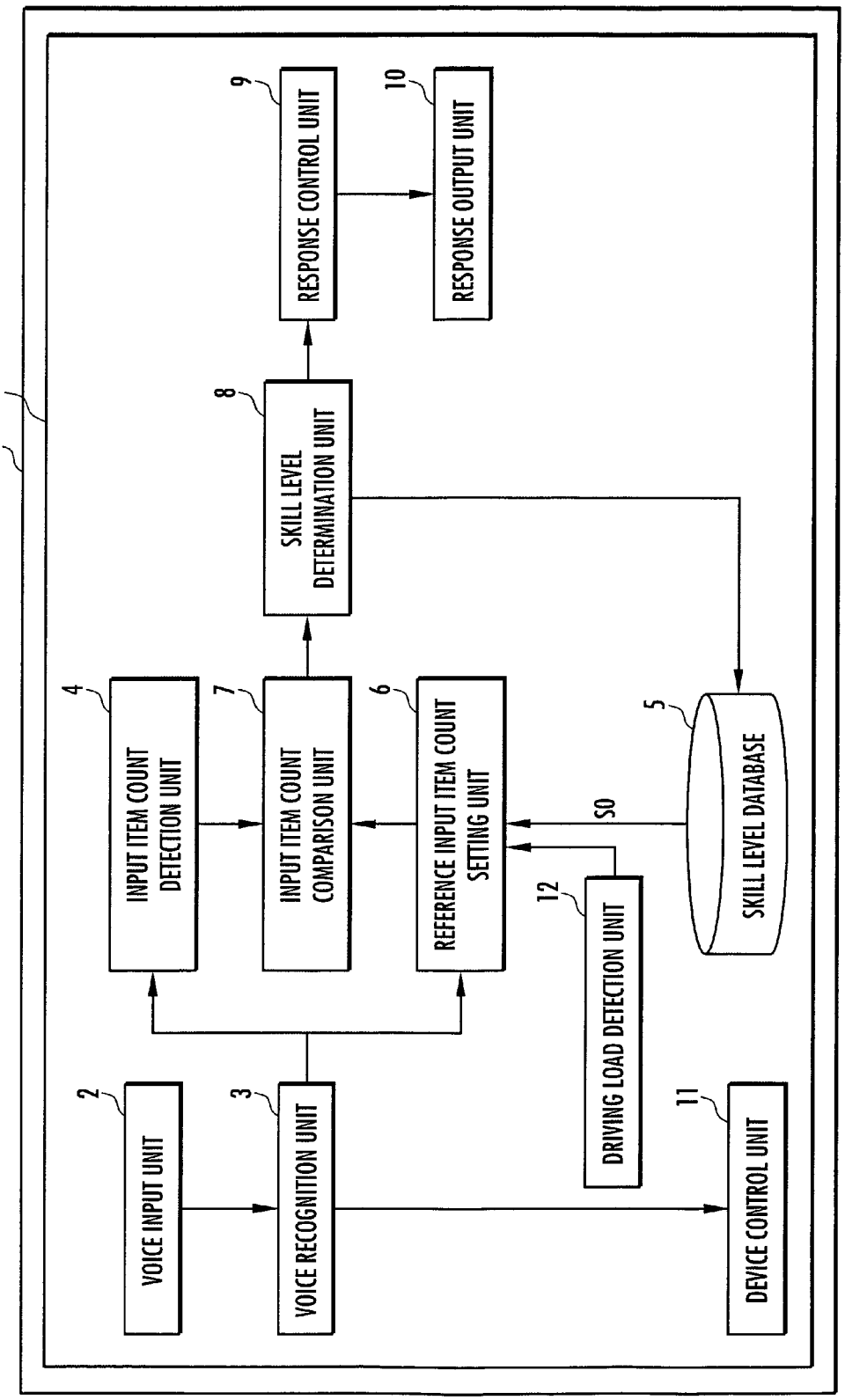
FIG. 1 is a functional block diagram of a voice recognition device controller according to this embodiment.

Referring to FIG. 1, a voice recognition device controller 1 is an electronic unit constituted by a microcomputer or the like, having processing facilities such as a voice input unit 2 for receiving speech input from a driver, a voice recognition unit 3 for recognizing the input speech, a response output unit 10 for outputting a response to the driver, and a device control unit 11 for controlling a device based on the recognition result, and a driving load detection unit 12 for detecting a driving load on the driver, and is mounted on a vehicle 13.

Furthermore, the voice recognition device controller 1 includes an input item count detection unit 4 for detecting the number of items (input item count) identified from the recognized speech among a given number of items necessary to control the device, a skill level database 5 for storing a driver's temporary skill level in speech, a reference input item count setting unit 6 for setting a reference value for the input item count based on the driver's temporary skill level in speech and driving load on the driver, an input item count comparison unit 7 for comparing the input item count with the reference value for the input item count, a skill level determination unit 8 for determining the driver's skill level in speech based on the comparison result, and a response control unit 9 for controlling the response output according to the determined skill level.

The voice input unit 2 is for use in receiving the speech from the driver of the vehicle 13 and is composed of a microphone or the like.

The voice recognition unit 3 performs voice recognition processing such as a syntax analysis for the speech input to the voice input unit 2 and extracts a keyword. For the voice recognition processing, it is possible to use a general technique as disclosed in the Patent Document 1.

The response output unit 10 is for use in outputting a response (voice guide) to the driver of the vehicle 13 and is composed of a speaker or the like. The response is output by voice, for example, by means of voice synthesis processing such as Text-To-Speech (TTS).

The device control unit 11 controls the device mounted on the vehicle 13 on the basis of data on a given number of items (described later) necessary to control the device, which are identified from the speech recognized by the voice recognition unit 3.

Although not shown, the controlled devices can be broadly classified into the categories: audio system, navigation system, and air conditioner mounted on the vehicle 13, in this embodiment. Hereinafter, these classified devices will be generically referred to as applications. Moreover, operational elements (device, content, and the like) provided for each application are previously set and the elements are controlled by the device control unit 11 as operational objects of each application. For example, if the application is an "audio system," the operational objects (devices) are a CD, a DVD, a radio, an MP3, a speaker, and the like. Furthermore, for example, if the application is a navigation system, the operational objects (contents) are a point of interest (POI), a map, and the like.

The driving load detection unit 12 detects a driving load on the driver of the vehicle 13 on the basis of a vehicle speed, a steering operation, a brake operation, perspiration on the palm of a hand, or the like detected by a sensor or other devices. The driving load on the driver is a value that indicates a degree that the driver is concentrating on driving or a degree that the driver should concentrate on driving. Under this condition, for example, the higher the vehicle speed is; the larger the steering operation amount is; the higher the frequency of the brake operation is; or the higher the perspiration on the palm of the hand is, the higher the considered driving load is.

The input item count detection unit 4 identifies data on a given number of items (input values of respective items) necessary to control the device on the basis of a keyword extracted by the voice recognition unit 3. The input item count detection unit 4 then detects the number of items whose input values are identified (input item count).

The items necessary to control the device include: "Application" as an item for specifying an application; "Operational object" as an item for specifying an operational object provided for each application; "Operation content" as an item for specifying an operation content for each operational object; and "Operation parameter" as an item for specifying a parameter necessary for the operation for each operation content. More specifically, the "Operation parameter" is composed of a total number N of operation parameters {Operation parameter 1, Operation parameter 2, - - - , Operation parameter N}. The total number N of operation parameters and the concrete contents of the operation parameters are previously set correspondingly to a combination of the application, the operational object, and the operation content. The total number (given number) of items necessary to control the device is obtained by N+3.

For example, data on the "Operation content" is "reproduction," "stop," and the like if data on the "Operational object" is a "CD." In addition, for example, if data on {Application, Operational object, and Operation content} are {audio system, CD, and reproduction}, respectively, the total number N of operation parameters is 2. "Operation parameter 1" is "CD name," which is an item for specifying the name of a CD to be reproduced and "Operation parameter 2" is "Track number," which is an item for specifying what ordinal position on the CD the musical piece started to be reproduced is in.

The skill level database 5 (the learning level storage unit in the present invention) is a storage medium such as a CD-ROM, DVD, HDD, or the like in which the driver's temporary skill level in speech is updatably stored. The driver's temporary skill level in speech is a value set based on the skill level determined from the driver's past speech.

The driver's temporary skill level (learning level) in speech is a value indicating a degree that the driver is familiar with the speech for controlling the device. In this embodiment, the skill level value is set to one of 1 to 3. The higher the skill level value is, the higher the driver's skill level is, which indicates that the driver is more familiar with the speech for controlling the device.

The skill level database 5 stores a driver's temporary skill level in speech for each "Application" and a driver's temporary skill level in speech for each "Operational object." The value of the temporary skill level for each application is set to an average (any fraction below the decimal point is rounded off) of the temporary skill levels for all the operational objects provided for the application.

For example, if the application is an "audio system" as shown in Table 1, the skill level database 5 stores 2 as the skill level for the "audio system" and stores {2, 1, 3, 1, and 3} as temporary skill levels for the operational objects provided for the audio system, {CD, DVD, radio MP3, and speaker}, respectively.

TABLE 1

| Application | | Operational object | |
|---|---|---|---|
| Type | Skill level | Type | Skill level |
| Audio system | 2 | CD | 2 |
| | | DVD | 1 |
| | | Radio | 3 |
| | | MP3 | 1 |
| | | Speaker | 3 |

The reference input item count setting unit 6 reads user's temporary skill level in speech stored in the skill level database 5 according to the application type or the operational object type identified from the speech recognized by the voice recognition unit 3. It then sets a reference value for the number of items whose input values are identified (input item count) from the speech on the basis of the read temporary skill level and the driving load on the driver detected by the driving load detection unit 12.

The input item count comparison unit 7 compares the input item count detected by the input item count detection unit 4 with the reference value for the input item count set by the reference input item count setting unit 6.

The skill level determination unit 8 (the learning level determination unit in the present invention) determines the driver's relative skill level in speech to the value of the driver's temporary skill level read from the skill level database 5 according to the comparison result of the input item count comparison unit 7. Moreover, the skill level determination unit 8 updates the value of the user's temporary skill level in speech stored in the skill level database 5 on the basis of the determination result.

The response control unit 9 controls the response output from the response output unit 10 according to the skill level determined by the skill level determination unit 8 and the driving load detected by the driving load detection unit 12. More specifically, the response control unit 9 generates the content of an output response (a query for prompting the driver for the next speech or a response for notifying the user of the completion of operation or the like) by combining previously stored voice, phrases, text, and the like. Furthermore, the response control unit 9 determines the speed and volume of the response when it is output.

Subsequently, the operation (voice recognition device control processing) of the voice recognition device controller 1 according to this embodiment will be described with reference to flowcharts shown in FIG. 2 to FIG. 6. FIG. 2, FIG. 3, FIG. 4, FIG. 5, FIG. 6, and FIG. 7 are a flowchart showing the entire operation (the main routine processing of the voice recognition device controller 1) of the voice recognition device control processing, a flowchart showing processing (subroutine processing) for analyzing an input statement, a flowchart showing processing (subroutine processing) for reading a temporary skill level, a flowchart showing processing (subroutine processing) for setting a reference value for an input item count, a flowchart showing processing (subroutine processing) for determining a skill level, and a flowchart showing processing (subroutine processing) for generating a query, respectively.

Figure 2:
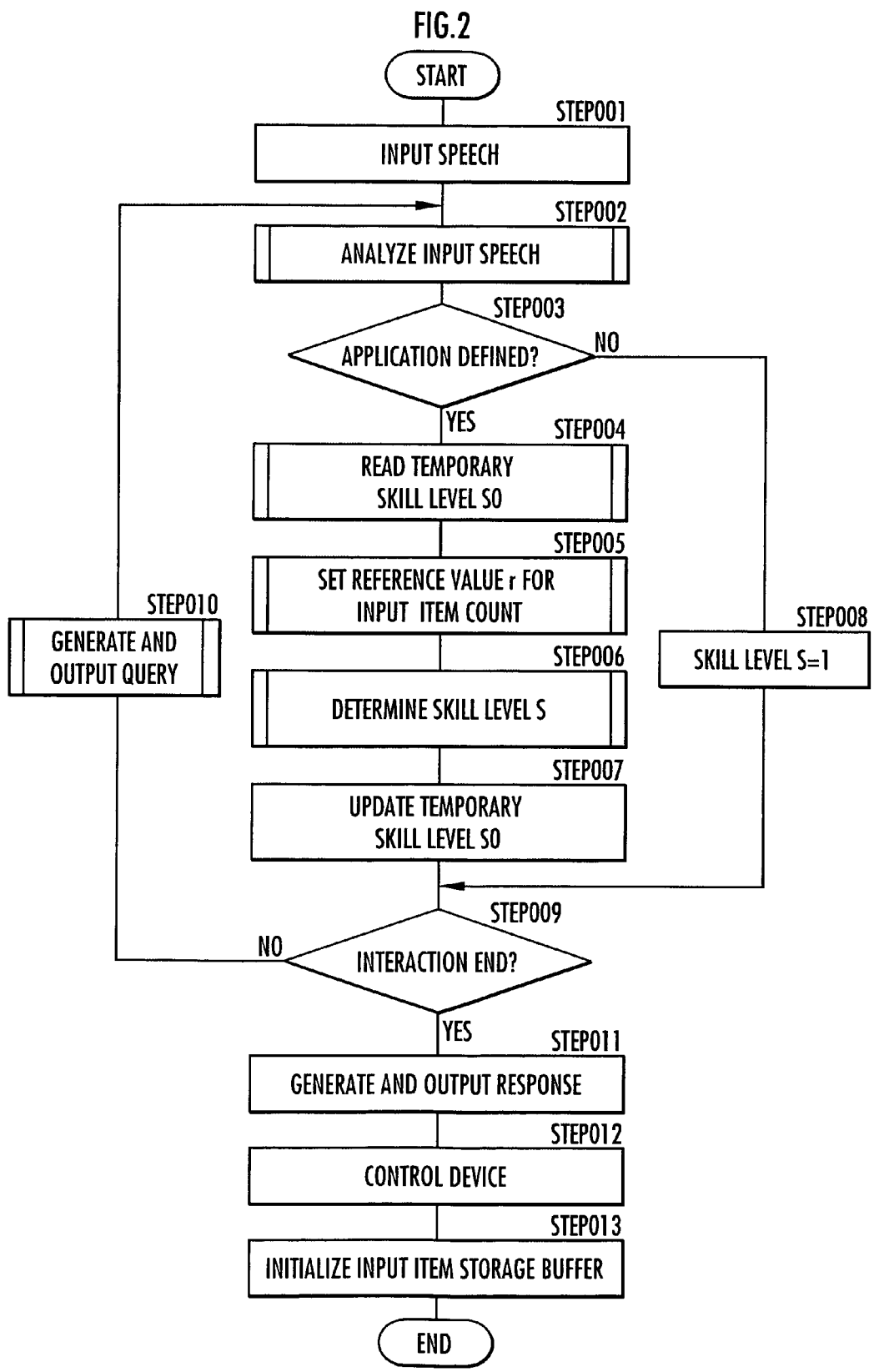
Figure 3:
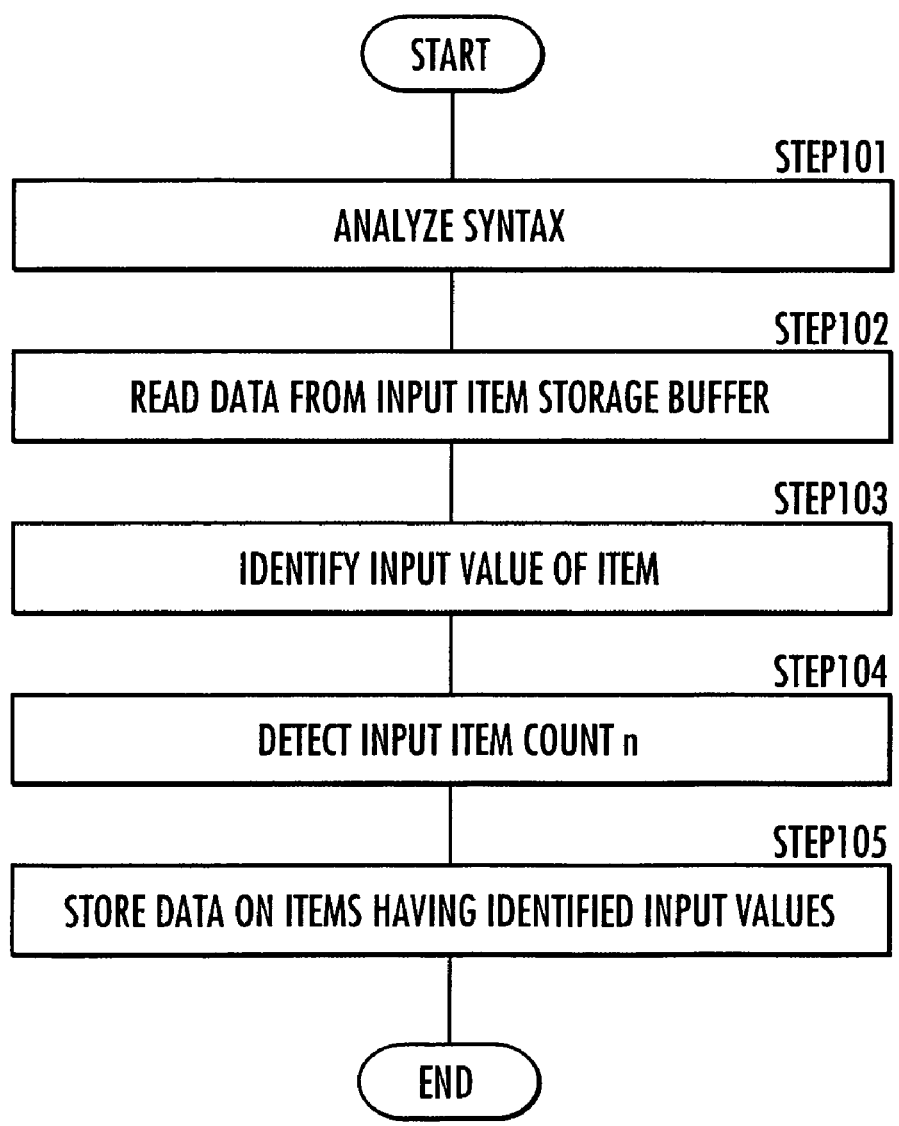

Referring to FIG. 2, first, the first speech (speech for starting the device control) is input from the driver of the vehicle 13 into the voice input unit 2 in step 001. Subsequently, the input speech is analyzed in step 002. The processing for analyzing the input speech is executed as shown in FIG. 3. First, in step 101, the voice recognition unit 3 performs voice recognition processing such as a syntax analysis regarding the speech input to the voice input unit 2 to extract a keyword in the syntax. Subsequently, the input item count detection unit 4 reads data from an input item storage buffer in step 102.

The input item storage buffer is for use in storing data (input values of the respective items) on a given number of items necessary to control the device. The input item storage buffer stores data on the items, {Application, Operational object, Operation content, and Operation parameter 1 to Operation parameter N}. Only the items, "Application, Operational object, and Operation content} are provided in an initial state, and "undefined" is stored as the data on each item to indicate that no input value is identified for the corresponding item.

Subsequently, in step 103, the input item count detection unit 4 selects a keyword that matches each item to identify the input value of the corresponding item from the speech. First in step 103, if there is any "undefined" item among {Application, Operational object, and Operation content} in the data read from the input item storage buffer, the input item count detection unit 4 selects a keyword that matches the "undefined" item to identify the input value of the item. If "Application" is undefined in the items {Application, Operational object, and Operation content}, processing for identifying the input value of "Application" is performed, first. After "Application" is defined, processing for identifying the input value of "Operational object" is performed. After "Operational object" is defined, processing for identifying the input value of "Operation content" is performed. Thus, the input values for the items are identified sequentially.

Thereafter, if there is still any undefined item in {Application, Operational object, and Operation content} as a result of identifying the input values in step 103, the processing proceeds to step 104, where the input item count detection unit 4 detects the number of items whose input values are identified (input item count n) and then the processing proceeds to step 105. On the other hand, if all items of {Application, Operational object, and Operation content} are defined as a result of identifying the input values in step 103, the input item count detection unit 4 sets concrete contents of the total number N of operation parameters corresponding to the combination of the items. At this point, the data on the operation parameters are "undefined." The input item count detection unit 4 then selects a keyword that matches the item of each operation parameter whose content has been set and identifies the input value for the corresponding item. Subsequently, the processing proceeds to step 104, where the number of items whose input values are identified (input item count n) and then the processing proceeds to step 105.

If all items of {Application, Operational object, and Operation content} have been defined in the data read from the input item storage buffer and concrete contents have been set for the total number N of operation parameters corresponding to the combination of the items in step 103, the input item count detection unit 4 selects a keyword that matches an "undefined" item of the operation parameter and identifies the input value of the item. Thereafter, the processing proceeds to step 104 to detect the number of items whose input values are identified (input item count n) and then proceeds to step 105.

In step 105, the input item storage buffer stores data on the items whose input values are identified. If an operation parameter is set in step 103, the item of the operation parameter is added to the items stored in the input item storage buffer. In addition, "undefined" is stored as data on the item of the operation parameter whose input value is not identified yet.

If there is an input of speech such as, for example, "Reproduce the second track on the third CD," data such as {audio system, CD, reproduction, disk 3, and track 2} are stored for the items {Application, Operational object, Operation content, CD name, and Track number} in the input item storage buffer as illustrated in Table 2.

TABLE 2

| Item | Data |
| --- | --- |
| Application | Audio system |
| Operational object | CD |
| Operation content | Reproduction |
| Operation parameter 1 | Disk 3 |
| Operation parameter 2 | Track 2 |

Returning to FIG. 2, it is determined whether the application is defined or not in step 003. If NO is selected as the determination result of step 003 (unless the application is defined), the processing proceeds to step 008, where the skill level determination unit 8 sets the skill level S (the skill level used to generate a query in step 010 described later) to 1, and then the processing proceeds to step 009. Thereby, the skill level S is determined to be 1, which is the lowest level, if the application cannot be defined from the input speech (if there is no input value identified for the item).

Figure 4:
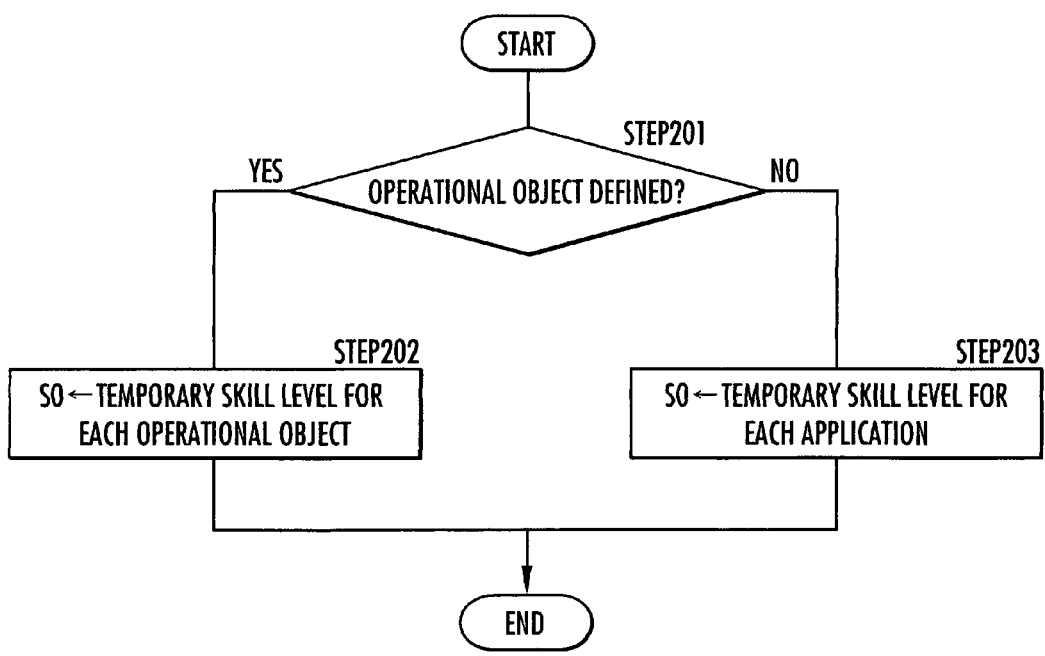

If YES is selected as the determination result of step 003 (if the application is defined), the processing of steps 004 to 007 described below is performed. First, in step 004, the driver's temporary skill level in speech is read from the skill level database 5. The processing for reading the temporary skill level is executed as shown in FIG. 4. First, in step 201, it is determined whether the operational object is defined or not. If YES is selected as the determination result of step 201, the processing proceeds to step 202 to read a temporary skill level S0 corresponding to the defined operational object among the temporary skill levels for the respective operational objects. If NO is selected as the determination result of step 201, the processing proceeds to step 203 to read the temporary skill level S0 corresponding to the defined application among the temporary skill levels for the respective applications from the skill level database 5.

Figure 5:
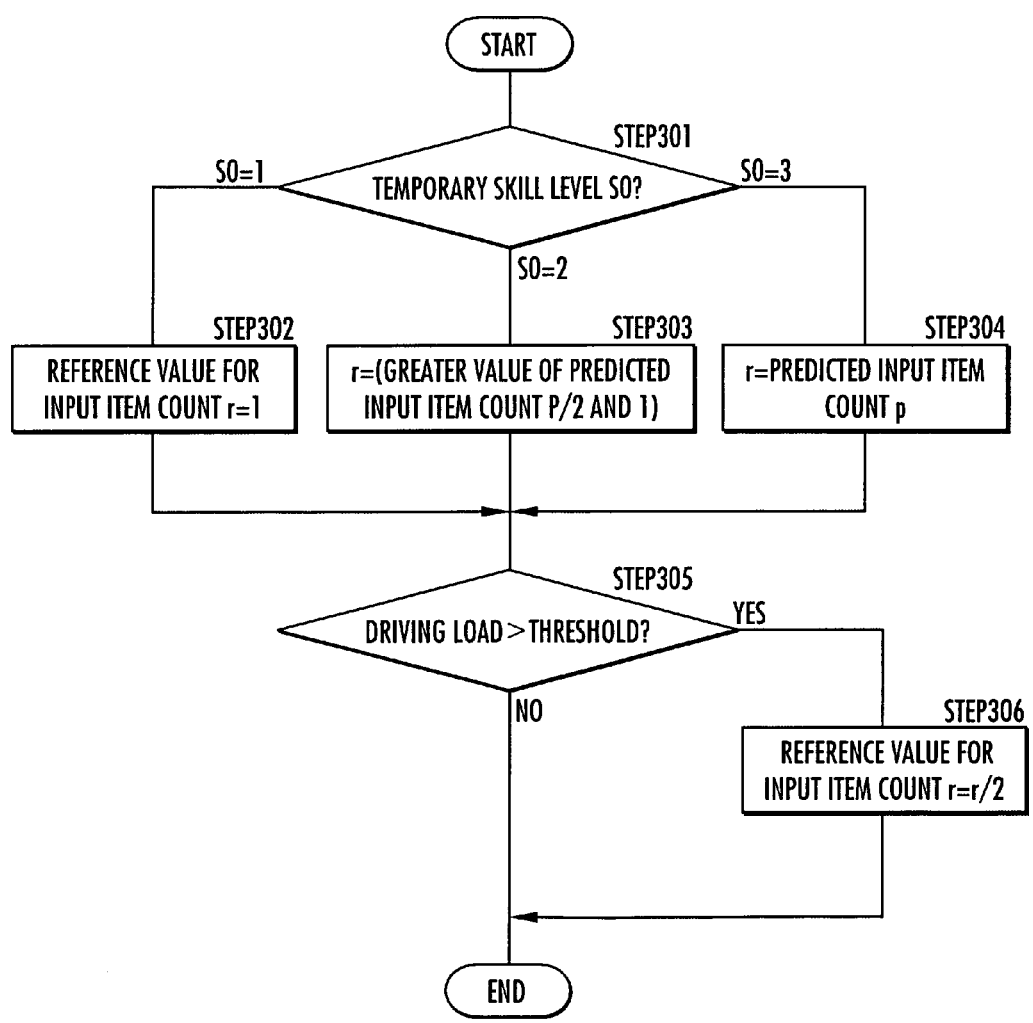

Subsequently, returning to FIG. 2, a reference value r for the input item count is set in step 005. The processing for setting the reference value r for the input item count is executed as shown in FIG. 5. First, in step 301, the reference input item count setting unit 6 checks which of 1 to 3 is the value of the temporary skill level S0 read from the skill level database 5. If S0 is 1 as the check result of step 301, the processing proceeds to step 302 to set the reference value r for the input item count to 1.

If S0 is 2 as the check result of step 301, the processing proceeds to step 303, where reference input item count setting unit 6 sets the reference value r for the input item count to a greater value of a predicted input item count p/2 (any fraction below the decimal point is rounded off) and 1. In the above, the predicted input item count p represents the predicted minimum number of input items that can be input by a driver having the highest skill level. For example, in the first speech, it can be expected that the driver having the highest skill level will be able to input at least all items of {Application, Operational object, and Operation content." Therefore, 3 is used for the predicted input item count p.

If S0 is 3 as the check result of step 301, the processing proceeds to step 304, where the reference input item count setting unit 6 sets the reference value r for the input item count to the value of the predicted input item count p. The higher the value of the temporary skill level S0 is, the greater the reference value r is set, according to the value of the temporary skill level S0 through the above steps 301 to 304.

Subsequently, the processing proceeds to step 305, where the driving load detection unit 12 detects a driving load on the driver on the basis of the vehicle speed, the steering operation, the brake operation, perspiration on the palm of a hand, or the like. Then, the detected driving load is digitized. Subsequently, it is determined whether the driving load is higher than a given threshold or not. If YES is selected as the determination result of step 305, the processing proceeds to step 306, where the reference input item count setting unit 6 sets the reference value r for the input item count to a value (any fraction below the decimal point is rounded off) obtained by dividing the reference value r set in one of steps 302 to 304 by 2. Thereafter, the processing returns to step 005 in FIG. 2. If NO is selected as the determination result of step 305, the processing directly returns to step 005 in FIG. 2. Thereby, if the driving load is high, the reference value r is set to a relatively low value according to the driving load on the driver.

Figure 6:
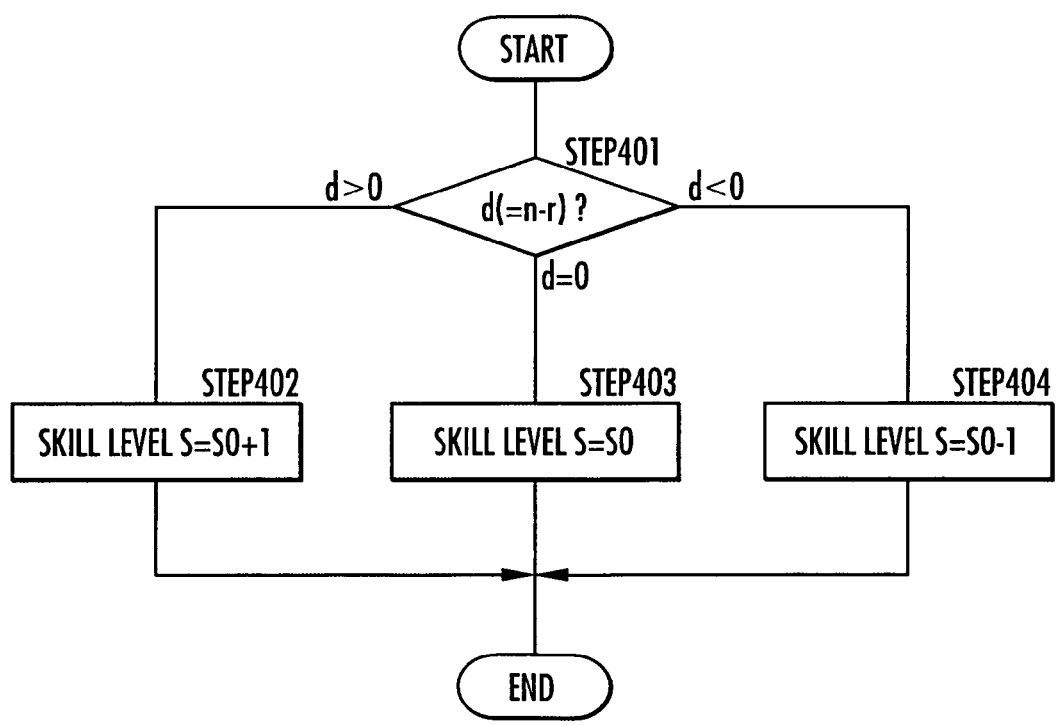

Subsequently, the processing proceeds to step 006 to determine the driver's skill level S in speech. The determined skill level S is one for the operational object if the operational object is defined or one for the application if the operational object is not defined while the application is defined. The processing for determining the skill level S is executed as shown in FIG. 6. First, in step 401, the input item count comparison unit 7 calculates a difference d (=n−r) between the input item count n and the reference value r for the input item count. Subsequently, the input item count comparison unit 7 compares the value of the calculated difference d with 0.

If d>0 as the comparison result of step 401, the processing proceeds to step 402, where the skill level determination unit 8 sets the skill level S to a value greater than the temporary skill level S0 by 1 (S=S0+1). If S0+1 is greater than 3, the skill level determination unit 8 sets the skill level S to 3. If d=0 as the comparison result of step 401, the processing proceeds to step 403, where the skill level determination unit 8 sets the skill level S to the same value as the temporary skill level S0 (S=S0). If d<0 as the comparison result of step 401, the processing proceeds to step 402, where the skill level determination unit sets the skill level S to a value smaller than the temporary skill level S0 by 1 (S=S0−1). The skill level determination unit 8 sets the skill level S to 1 if S0−1 is smaller than 1.

Thereby, the user's skill level S in speech is determined according to whether the user can input a great number of items with one-time speech or not. Accordingly, the user's skill level S in speech for controlling the device is properly determined independently of, for example, the tendency of the user's speech such as the rate of speech or the number of speech sounds. In this determination, the skill level S is determined by the comparison with the reference value r set based on the temporary skill level S0. Therefore, the current skill level S is set relatively to the temporary skill level S0.

Subsequently, returning to FIG. 2, the temporary skill level S0 stored in the skill level database 5 is updated by using the determined skill level S in step 007. If the skill level S is for the application then, the temporary skill level S0 for the corresponding application stored in the skill level database 5 is updated. If the skill level S is for the operational object, the temporary skill level S0 for the corresponding operational object stored in the skill level database 5 is updated. Thereby, the reference value r for determining the skill level S in the next speech is set based on the temporary skill level S0 appropriately updated.

Subsequently, it is determined whether the speech with the driver is completed or not in step 009. If all the input values of the necessary items to control the device are identified, the speech is determined to be completed.

If NO is selected as the determination result of step 009, the processing proceeds to step 010 to generate and output a query to the driver. The processing for generating and outputting the query is executed as shown in FIG. 7. First, in step 501, the response control unit 9 checks which of 1 to 3 is the value of the skill level S set in step 006 or 008.

If the check result of step 501 is 1 (skill level S=1), the processing proceeds to step 502, where the response control unit 9 sets the number of query items (query item count q), which prompts the user for input in the next speech, to 1. If the check result in step 501 is 2 (skill level S=2), the processing proceeds to step 503, where the response control unit 9 sets the query item count q to a greater value of the uninput item count s/2 (any fraction below the decimal point is rounded off) and 1. In the above, the uninput item count s represents the number of items whose input values are not identified yet among the necessary items to control the device. If the check result of step 501 is 3 (S=3), the processing proceeds to step 504, where the response control unit 9 sets the query item count q to the value of the uninput item count s. Through the above steps 501 to 504, the query item count q is set greater as the value of the skill level S increases, according to the value of the skill level S.

Subsequently, the processing proceeds to step 505, where it is determined whether the driving load on the driver is higher than a given threshold or not. If YES is selected as the determination result of step 505, the processing proceeds to step 506, where the response control unit 9 sets the query item count q to a value obtained by dividing the query item count q set in one of steps 502 to 504 by 2 (any fraction below the decimal point is rounded off), and then processing proceeds to step 507. If NO is selected as the determination result of step 505, the processing directly proceeds to step 507. Thereby, if the driving load is high, the query item count q is set to a relatively low value, according to the driving load on the driver.

Subsequently, in step 507, the response control unit 9 generates a query that prompts for input of an item in the query item count q among the items whose input values are not identified yet. For example, if no input value is identified for an item when the query item count q is 1, a query prompting for input of "Application" is generated. Moreover, for example, if only the input value of "Application" is identified when the query item count q is 1, a query that prompts for input of "Operational object" is generated. If the query item count q is extremely high, a query is generated with the query item count q limited to a given maximum value. Subsequently, in step 508, the generated query is output from the response output unit 10. Thereby, an appropriate query that prompts for the driver's next speech is generated according to the driver's skill level and the driving load on the driver. Then, the output of the query generated in this way prompts for the user's next speech, by which an efficient speech is achieved.

Subsequently, returning to step 001 in FIG. 2, the driver inputs the second speech. Similarly to the first speech, the processing of steps 001 to 008 is performed. In the second speech (the speech to the query output from the response output unit 10), however, the same value as the uninput item count s (=the query item count q to the driver having the highest skill level) used in the above steps 502 and 503 is used as the predicted input item count p used in steps 303 and 304 of FIG. 5 in performing the processing for setting the reference value r for the input item count in step 005. If the query item count q is limited in step 507, the same value as the given maximum value is used for the predicted input item count p.

Subsequently, in step 009, it is determined whether the interaction with the driver is completed or not. If NO is selected as the determination result of step 009, the processing proceeds to step 010, where the response control unit 9 generates a query to the driver. Then, the generated query is output from the response output unit 10.

Hereinafter, the same processing as in the above step 001 to step 008 for the second speech is repeated until YES is selected as the determination result of step 009.

If YES is selected as the determination result of step 009, the processing proceeds to step 011, where the response control unit 9 generates, for example, a response for confirming the input value of each identified item (a response for notifying the driver of the input value of each item). Then, the generated response is output from the response output unit 10. Subsequently, in step 012, the device control unit 11 controls the device based on the data on the item whose input value is identified. Subsequently, in step 013, the input item storage buffer is initialized (reset) and the processing is terminated. When the input item storage buffer is initialized, the temporary skill level for the application defined in the above processing is updated by an average (any fraction below the decimal point is rounded off) of the temporary skill levels for all the operational objects of the application in the skill level database 5. Through the above processing, the driver's skill level in speech is properly determined for each speech and information for controlling the device (data on the necessary items to control the device) is obtained by means of an efficient interaction.

Subsequently, the above operation will be described in detail below with reference to an interaction example shown in FIGS. 8(*a*) to 8(*c*). The interaction example in FIG. 8(*a*) is described, first. The interaction example in FIG. 8(*a*) is for a situation where the driver reproduces a CD. This interaction example assumes that the temporary skill level S0 is 2 if the application is an "audio system" in the skill level database 5 and is 2 if the operational object is a "CD." Moreover, the driving load on the driver is assumed to be equal to or lower than a threshold value.

In the interaction example in FIG. 8(*a*), first, in step 001, the driver inputs speech such as, for example, "Play a CD." Subsequently, in step 002, the input speech is analyzed, by which the input values of the items, {Application, Operational object, and Operation content} are identified as {audio system, CD, and reproduction}, respectively. Furthermore, operation parameters are set correspondingly to the combination of {audio system, CD, and reproduction}. In this case, the operation parameters are "CD name," which is a parameter for specifying the CD to be reproduced, and "Track number," which is a parameter for specifying what ordinal position on the CD the musical piece to be reproduced is in. The input values of the items, "CD name" and "Track number," are not identified from the speech, so that the input item count n is set to 3. Thereafter, data on "Application," "Operational object," and "Operation content" whose input values are identified are stored in the input item storage buffer. Furthermore, "undefined" is stored as data on "CD name" and "Track number."

Subsequently, the application is already defined as "audio system" in step 003, and therefore the processing proceeds to step 004. The operational object is defined as a "CD" in step 004, and therefore the temporary skill level S0 set to 2 for the "CD" is read from the skill level database 5. Subsequently, in step 005, the temporary skill level S0 is 2, the predicted input item count p is set to 3 (a given value) since it is the first speech, and the driving load is equal to or lower than the threshold value, and therefore the reference value r is set to 2 (r=p/2).

Subsequently, in step 006, the skill level S is set to 3 in accordance with d=n−r=1>0 (S=S0+1). In this way, if the driver is considered to be familiar with speech, such as in the case where the input values are identified for all items of {Application, Operational object, and Operation content} at the first speech, the skill level S is determined to be the highest level 3, which is higher than the temporary skill level S0 set to 2.

Subsequently, in step 007, the temporary skill level S0 for the "CD" is updated to 3 in the skill level database 5. Subsequently, there are items whose input values are not identified yet (in this case, "CD name" and "Track number") in step 009, and therefore the processing proceeds to step 010.

In step 010, the skill level S is 3, the uninput item count s is set to 2 since the number of items whose input values are not identified is 2, and the driving load is equal to or lower than the threshold value, and therefore the query item count q is set to 2 (q=s). Then, a query, "Please input the CD name or artist name and the track number," is generated to prompt for "CD name" and "Track number." The query is then output by voice to the driver. In this way, if the driver has a high skill level S and is considered to be familiar with speech, a query prompting for all the remaining items is output.

Subsequently, in step 001, the driver inputs speech, "Play the Honda CD from the beginning," to the output query. In step 002, the input values of the items, "CD name" and "Track number," are identified to be "Honda" and "beginning," respectively, anew and the input item count n is set to 2. Then, the data on the items, "CD name" and "Track number," whose input values are identified are stored in the input item storage buffer.

Subsequently, the application is defined as "audio system" in step 003. Therefore, the processing proceeds to step 004, where the operational object is defined as "CD" and therefore the temporary skill level S0 set to 3 for the "CD" is read from the skill level database 5. Subsequently, in step 005, the temporary skill level S0 is 3, the predicted input item count p is set to 2 (=uninput item count s) since the speech is made for the output query, and the driving load is equal to or lower than the threshold value, and therefore the reference value r is set to 2 (r=p).

Subsequently, in step 006, the skill level S is set to 3 (S=S0) in accordance with d=n−r=0. In this way, if all of the input values of the items prompted for in the query can be identified from the input speech, the skill level S is determined to be the same as the temporary skill level S0.

Subsequently, in step 009, the input values of five items necessary to control the device (audio system) are all identified and therefore the interaction is determined to be completed. The processing then proceeds to step 011. In step 011, such a response as to confirm the identified input values of the items, "Then, I'll play the Honda CD from the beginning," is output. Subsequently, in step 012, the Honda CD is reproduced from the beginning. Next, in step 013, the input item storage buffer is initialized, the temporary skill level S0 for the "audio system" is updated in the skill level database 5, and the processing terminates. Through the above processing, the driver's skill level S in speech is properly determined and thereby the device is controlled through an efficient interaction.

The interaction example in FIG. 8(*b*) is then described below. The interaction example in FIG. 8(*b*) is for a situation where the driver conducts search by using the POI search function of a navigation system. This interaction example assumes that the temporary skill level is 2 if the application is a "navigation system" in the skill level database 5 and is 2 if the operational object is a "POI." Moreover, the driving load on the driver is assumed to be equal to or lower than a threshold value.

In the interaction example in FIG. 8(*b*), first, in step 001, the driver inputs speech, "Search for a convenience store." Subsequently, in step 002, the input speech is analyzed, by which the input values of the items, {Application, Operational object, and Operation content}, are identified as "navigation system, POI, and search," respectively. Furthermore, operation parameters are set correspondingly to the combination of "navigation system, POI, and search." In this case, the operation parameters are "Search condition" as a parameter for specifying a search condition for searching for information and "Narrowing condition 1" and "Narrowing condition 2" as parameters for specifying a predetermined given number (for example, two) of narrowing conditions for narrowing retrieved information. Then, the input value of the "Search condition" is identified as "a convenience store" from the speech. The input values of "Narrowing condition 1" and "Narrowing condition 2" are not identified from the speech, so that the input item count n is set to 4. Thereafter, data on "Application," "Operational object," "Operation content," and "Search condition" whose input values are identified are stored in the input item storage buffer. Furthermore, "undefined" is stored as data on "Narrowing condition 1" and "Narrowing condition 2."

Subsequently, the application is already defined as a "navigation system" in step 003, and therefore the processing proceeds to step 004. The operational object is defined as a "POI" in step 004, and therefore the temporary skill level S0 set to 2 for the "POI" is read from the skill level database 5. Subsequently, in step 005, the temporary skill level S0 is 2, the predicted input item count is set to 3 (a given value) since it is the first speech, and the driving load is equal to or lower than the threshold value, and therefore the reference value r is set to 2 (r=p/2).

Subsequently, in step 006, the skill level S is set to 3 in accordance with d=n−r=2>0 (S=S0+1). In this way, if the driver can be considered to be familiar with speech, such as in the case where the input values are identified for all items of "Application, Operational object, and Operation content" at the first speech and further the input values of "Operation parameters" are identified, the skill level S is determined to be the highest level 3, which is higher than the temporary skill level S0 set to 2.

Subsequently, in step 007, the temporary skill level for the "POI" is updated to 3 in the skill level database 5. Subsequently, there are items whose input values are not identified yet (in this case, "Narrowing condition 1" and "Narrowing condition 2") in step 009, and therefore the processing proceeds to step 010.

In step 010, the skill level S is 3, the uninput item count s is set to 2 since the number of items whose input values are not identified is 2, and the driving load is equal to or lower than the threshold value, and therefore the query item count q is set to 2 (q=s). Then, a query, "Please input the type of the convenience store and additional search conditions," is generated to prompt for "Narrowing condition 1" and "Narrowing condition 2." Specifically, "Narrowing condition 1" is determined to be a parameter for specifying the type (brand name) of the convenience store based on that the data on "Search condition" is the "convenience store." The query is then output by voice to the driver. In this way, if the driver has a high skill level S and is considered to be familiar with speech, a query prompting for all the remaining items is output.

Subsequently, in step 001, the driver inputs speech, "Any nearest one." In step 002, the input values of the items, "Narrowing condition 1" and "Narrowing condition 2," are identified as "not specified" and "nearest," respectively, anew and the input item count n is set to 2. Then, the data on "Narrowing condition 1" and "Narrowing condition 2" whose input values are identified are stored in the input item storage buffer.

Subsequently, the application is defined as "navigation system" in step 003. Therefore, the processing proceeds to step 004, where the operational object is defined as "POI" and therefore the temporary skill level S0 set to 3 for the "POI" is read from the skill level database 5. Subsequently, in step 005, the temporary skill level S0 is 3, the predicted input item count p is set to 2 (=uninput item count s) since the speech is made for the output query, and the driving load is equal to or lower than the threshold value, and therefore the reference value r is set to 2 (r=p).

Subsequently, in step 006, the skill level S is set to 3 (S=S0) in accordance with d=n−r=0. In this way, if the input values of all items prompted for in the query can be identified from the input speech, the skill level S is determined to be the same as the temporary skill level S0.

Subsequently, in step 009, the input values of six items necessary to control the device (navigation system) are all identified and therefore the interaction is determined to be completed. Thereafter, the processing proceeds to step 011. In step 011, such a response as to confirm the identified input values of the items, "Then, I'll show you the way to the nearest Honda-Mart store," is output. Subsequently, in step 012, the navigation system presents a driving route to the Honda-Mart store or the like to the driver. Next, in step 013, the input item storage buffer is initialized, the temporary skill level for the "navigation system" is updated in the skill level database 5, and the processing terminates. Through the above processing, the driver's skill level S in speech is properly determined and thereby the device is controlled through an efficient interaction.

Subsequently, the interaction example in FIG. 8(*c*) is described below. The interaction example in FIG. 8(*c*) is for a situation where the driver reproduces a CD. This interaction example assumes that the temporary skill level is 2 if the application is an "audio system" in the skill level database 5 and is 2 if the operational object is a "CD." Moreover, the driving load on the driver is assumed to be equal to or lower than a threshold value.

In the interaction example in FIG. 8(*c*), first, in step 001, the driver inputs speech, "I want to listen to music." Subsequently, in step 002, the input speech is analyzed, by which the input value of the item, "Application" is identified as an "audio system." Since the input value of "Operational object" is not identified, the input value of "Operation content" is not identified and any operation parameters are not set, either. The input item count n is set to 1. Then, data on "Application" whose input value is identified is stored in the input item storage buffer.

Subsequently, the application is already defined as "audio system" in step 003, and therefore the processing proceeds to step 004. The operational object is not defined in step 004, and therefore the temporary skill level S0 set to 2 for the "audio system" is read from the skill level database 5. Subsequently, in step 005, the temporary skill level S0 is 2, the predicted input item count is set to 3 (a given value) since it is the first speech, and the driving load is equal to or lower than the threshold value, and therefore the reference value r is set to 2 (r=p/2).

Subsequently, in step 006, the skill level S is set to 1 in accordance with d=n−r=−1<0 (S=S0−1). In this way, if the driver is considered to be unfamiliar with speech, such as in the case where only the input value of "Application" is identified at the first speech, the skill level S is determined to be level 1, which is lower than the temporary skill level S0 set to 2.

Next, in step 007, the temporary skill level for the "audio system" is updated to 1 in the skill level database 5. Subsequently, there are items whose input values are not identified yet (in this case, "Operational object" and "Operation content") in step 009, and therefore the processing proceeds to step 010.

In step 010, the query item count q is set to 1 (a given value) since the skill level S is 1 and the driving load is equal to or lower than the threshold value. Then, a query, "Please select the device to be operated, such as CD, DVD, or radio," is generated to prompt for "Operational object." The query is then output by voice to the driver. In this way, if the driver has a low skill level S and is considered to be unfamiliar with speech, the query is output in such a way as to prompt for items one by one.

Subsequently, in step 001, the driver inputs speech, "Play the Honda CD," to the output query. In step 002, the input values of the items, "Operational object" and "Operation content," are identified as "CD" and "reproduction," respectively, anew. Furthermore, operation parameters are set correspondingly to the combination, {audio system, CD, and reproduction}. In this case, the operation parameters are "CD name," which is a parameter for specifying a CD to be reproduced, and "Track number," which is a parameter for specifying what ordinal position on the CD the musical piece started to be reproduced is in. Then, the input value of "CD name" is identified to be "Honda" from the speech. The input value of "Track number" is not identified, so that the input item count n is set to 3. Thereafter, the input item storage buffer stores data on the items, "Operational object," "Operation content," and "CD name," whose input values are identified. In addition, "undefined" is stored as data on "Track number."

Subsequently, the application is defined as "audio system" in step 003. Therefore, the processing proceeds to step 004, where the operational object is defined as "CD" and therefore the temporary skill level S0 set to 2 for the "CD" is read from the skill level database 5. Thereby, if the operational object is defined, the current skill level S in speech is determined based on the temporary skill level S0 for each operational object. Therefore, even if the driver's skill level S depends upon the operational object, the current skill level S in speech is properly determined. Subsequently, in step 005, the temporary skill level S0 is 2, the predicted input item count p is set to 2 (=uninput item count s) since the speech is made for the output query, and the driving load is equal to or lower than the threshold value, and therefore the reference value r is set to 1 (r=p/2).

Subsequently, in step 006, the skill level S is set to 3 (S=S0+1) in accordance with d=n−r=2>0. In this way, if the input values of more items than those prompted for in the query can be identified from the input speech, the skill level S is determined to be the highest level 3, which is higher than the temporary skill level S0 set to 2.

Next, in step 007, the temporary skill level for the "CD" is updated in the skill level database 5. Subsequently, there is an item whose input value is not identified yet (in this case, "Track number") in step 009, and therefore the processing proceeds to step 010.

In step 010, the skill level S is 3, the uninput item count s is set to 1 since the number of items whose input values are not identified is 1, and the driving load is equal to or lower than the threshold value, and therefore the query item count q is set to 1 (q=s). Thereafter, a query, "Please input the track number," is generated to prompt for "Track number." The query is then output by voice to the driver. In this way, if the driver has the high skill level S and is considered to be familiar with speech, a query prompting for all the remaining items is output.

Subsequently, in step 001, the driver inputs speech, "From the beginning," to the output query. In step 002, the input value of "Track number" is identified to be "beginning" anew and the input item count n is set to 1. Then, the data on "Track number" whose input value is identified is stored in the input item storage buffer.

Subsequently, the application is already defined as "audio system" in step 003, and therefore the processing proceeds to step 004. The operational object is defined as "CD" and therefore the temporary skill level S0 set to 3 for the "CD" is read from the skill level database 5. Subsequently, in step 005, the temporary skill level S0 is 3, the predicted input item count p is set to 1 (=query item count q) since it is the first speech for the output query, and the driving load is equal to or lower than the threshold value, and therefore the reference value r is set to 1 (r=p).

Subsequently, in step 006, the skill level S is set to 3 in accordance with d=n−r=0 (S=S0). In this way, if the input values of all items prompted for in the query can be identified from the input speech, the skill level S is determined to be the same as the temporary skill level S0.

Next, in step 007, the skill level for the "CD" is updated in the skill level database 5.

Subsequently, in step 009, the input values of five items necessary to control the device (audio system) are all identified and therefore the interaction is determined to be completed. Thereafter, the processing proceeds to step 011. In step 011, such a response as to confirm the identified input values of the items, "Then, I'll play the Honda CD from the beginning," is output. Subsequently, in step 012, the Honda CD is reproduced from the beginning. Next, in step 013, the input item storage buffer is initialized, the temporary skill level for the "audio system" is updated in the skill level database 5, and the processing terminates. Through the above processing, the driver's skill level S in speech is properly determined and thereby the device is controlled through an efficient interaction.

While the driving load detection unit 12 is provided in the above embodiment, the driving load detection unit 12 can be omitted. If so, the reference input item count setting unit 6 directly uses the reference value r for the input item count determined in steps 302 to 304 according to the temporary skill level S0. In addition, the response control unit 9 directly uses the query item count q determined in steps 502 to 504.

Furthermore, while the temporary skill level S0 stored in the skill level database 5 is updated for every speech (step 007 in FIG. 2) in the above embodiment, the temporary skill level S0 can also be updated at given timings reflecting the tendency of the variation in the user's skill level S in the past speech.

Still further, while the user performing voice input is the driver of the vehicle 13 in the above embodiment, the user can be an occupant other than the driver.

Furthermore, while the voice recognition device controller 1 is mounted on the vehicle 13 in the above embodiment, it can also be mounted on a movable body other than a vehicle.

What is claimed is:

1. A voice recognition device controller comprising:
   a voice input unit configured to receive a one-time speech input from a user containing a plurality of items necessary to control a device, wherein the items in the input user's speech necessary to control the device include at least (1) an application of the device, (2) an operational object of the application, (3) an operational content of the operational object, and (4) at least one operational parameter of the operational content:
   a voice recognition unit configured to recognize the plurality of items necessary to control the device from the one-time speech input to the voice input;
   an input item count detection unit configured to count the total number of items necessary to control the device recognized in the current input one-time speech of the user by the voice recognition unit
   a reference input item count setting unit configured to set a reference value for the number of items identified from the current input one-time speech of the user based on a driving load on the user, wherein the reference value for the number of items is higher or lower than the actual number of items identified by the input item count detection unit;
   an input item count comparison unit configured to compare the total number of items detected by the input item count detection unit from the current input one-time speech with the reference value for the number of items set by the reference input item count setting unit;
   a learning level determination unit configured to determine a learning level in speech of the user based on a comparison result of the input item count comparison unit;
   a response control unit configured to control the response output from a response output unit according to the learning level determined by the learning level determination unit, wherein, if the determined learning level in speech of the user is high, the response output prompts the user to input at one-time a plurality of items necessary to control the device, and if the determined learning level in speech is low, the response output prompts the user to input items necessary to control the device one by one; and
   a device control unit configured to control the device based on the user input.

2. A voice recognition device controller according to claim 1, further comprising a learning level storage unit configured to updatably store the user's temporary learning level in speech, wherein the reference input item count setting unit sets the reference value for the number of items identified from the speech based on the user's temporary learning level in speech stored by the learning level storage unit.

3. A voice recognition device controller according to claim 2, wherein:
   the device includes a plurality of types of device;
   the learning level storage unit stores the user's temporary learning level in speech for each type of device;
   the reference input item count setting unit sets the reference value for the number of items identified from the speech for each type of device;
   the input item count comparison unit compares the number of items detected by the input item count detection unit with the reference value for the number of items set for each type of device; and
   the learning level determination unit determines the user's learning level in speech for each type of device based on the comparison result of the input item count comparison unit.

4. A voice recognition device controller according to claim 3, wherein:
   a plurality of the types of devices are each provided with a plurality of types of operational objects that can be operated by the user;
   the given number of items necessary to control the device include items necessary to operate the operational objects;
   the learning level storage unit stores the user's temporary learning level in speech for each type of device and for each type of operational object;
   the reference input item count setting unit sets the reference value for the number of items identified from the speech for each type of device and for each type of operational object;

5. A voice recognition device controller according to claim 4, wherein the learning level storage unit updates the user's temporary learning level in speech stored in the learning level storage unit, based on the determination result of the learning level determination unit.

6. A voice recognition device controller according to claim 5, mounted on a movable body and further comprising a driving load detection unit configured to detect a driving load on the user who is the driver of the movable body, wherein the reference input item count setting unit sets the reference value for the number of items identified from the speech based on the user's temporary learning level in speech stored by the learning level storage unit and the driving load detected by the driving load detection unit.

7. A voice recognition device controller according to claim 1, wherein the response control-unit includes a unit configured to control a response in such a way as to prompt the user for a given number of items, with the given number set according to the learning level determined by the learning level determination unit, among items not identified from the speech recognized by the voice recognition unit, if any, among the given number of items necessary to control the device.

8. A voice recognition device controller according to claim 1, mounted on a movable body and further comprising a driving load detection unit configured to detect the driving load on the user who is the driver of the movable body, wherein the reference input item count setting unit sets the reference value for the number of items identified from the speech based on the content of the input speech and the driving load detected by the driving load detection unit.

9. A voice recognition device controller according to claim 8, wherein the response control unit includes a unit configured to control a response in such a way as to prompt the user for a given number of items, with the given number set according to the learning level determined by the learning level determination unit and the driving load detected by the driving load detection unit, among items not identified from the speech recognized by the voice recognition unit, if any, among the given number of items necessary to control the device.

10. A voice recognition device controller according to claim 2, wherein the learning level storage unit updates the user's temporary learning level in speech stored in the learning level storage unit, based on a determination result of the learning level determination unit.

11. A voice recognition device controller according to claim 10, mounted on a movable body and further comprising a driving load detection unit configured to detect a driving load on the user who is the driver of the movable body, wherein the reference input item count setting unit sets the reference value for the number of items identified from the speech based on the user's temporary learning level in speech stored by the learning level storage unit and the driving load detected by the driving load detection unit.

12. A voice recognition device controller according to claim 2, wherein the response control unit includes a unit configured to control a response in such a way as to prompt the user for a given number of items, with the given number set according to the learning level determined by the learning level determination unit, among items not identified from the speech recognized by the voice recognition unit, if any, among the given number of items necessary to control the device.

13. A voice recognition device controller according to claim 2, mounted on a movable body and further comprising a driving load detection unit configured to detect the driving load on the user who is the driver of the movable body, wherein the reference input item count setting unit sets the reference value for the number of items identified from the speech based on the user's temporary learning level in speech stored by the learning level storage unit and the driving load detected by the driving load detection unit.

14. A voice recognition device controller according to claim 13, wherein the response control unit includes a unit configured to control a response in such a way as to prompt the user for a given number of items, with the given number set according to the learning level determined by the learning level determination unit and the driving load detected by the driving load detection unit, among items not identified from the speech recognized by the voice recognition unit, if any, among the given number of items necessary to control the device.

15. A voice recognition device controller according to claim 3, wherein the learning level storage unit updates the user's temporary learning level in speech stored in the learning level storage unit, based on the determination result of the learning level determination unit.

16. A voice recognition device controller according to claim 15, mounted on a movable body and further comprising a driving load detection unit configured to detect a driving load on the user who is the driver of the movable body, wherein the reference input item count setting unit sets the reference value for the number of items identified from the speech based on the user's temporary learning level in speech stored by the learning level storage unit and the driving load detected by the driving load detection unit.

17. A voice recognition device controller according to claim 3, mounted on a movable body and further comprising a driving load detection unit configured to detect a driving load on the user who is the driver of the movable body, wherein the reference input item count setting unit sets the reference value for the number of items identified from the speech based on the user's temporary learning level in speech stored by the learning level storage unit and the driving load detected by the driving load detection unit.

18. A voice recognition device controller according to claim 4, mounted on a movable body and further comprising a driving load detection unit configured to detect a driving load on the user who is the driver of the movable body, wherein the reference input item count setting unit sets the reference value for the number of items identified from the speech based on the user's temporary learning level in speech stored by the learning level storage unit and the driving load detected by the driving load detection unit.

19. A method of controlling a voice recognition device, comprising:
receiving one-time speech input from a user containing a plurality of items necessary to control a device, wherein the items in the input user's speech necessary to control the device include at least (1) an application of the device, (2) an operational object of the application, (3) an operational content of the operational object, and (4) at least one operational parameter of the operational content;
recognizing the plurality of items necessary to control the device from the one-time speech
counting the total number of items necessary to control the device recognized in the current input one-time speech of the user
setting a reference value for the number of items identified from the current input one-time speech of the user based on a driving load on the user, wherein the reference value for the number of items is higher or lower than the actual number of items identified by the input item count detection unit;
comparing the total number of recognized items in the current input one-time speech with the reference value;
determining a learning level in speech of the user based on a comparison result; and
controlling a response output according to the determined learning level wherein, if the determined learning level in speech of the user is high, the response output prompts the user to input at one-time a plurality of items necessary to control the device, and if the determined learning level in speech is low, the response output prompts the user to input items necessary to control the device one by one; and
controlling the device based on the user input.

20. A voice recognition device controller comprising:
a voice input means for receiving a one-time speech input from a user containing a plurality of items necessary to control a device, wherein the items in the input user's speech necessary to control the device include at least (1) an application of the device, (2) an operational object of the application, (3) an operational content of the operational object, and (4) at least one operational parameter of the operational content;
a voice recognition means for recognizing the plurality of items necessary to control the device from the one-time speech input to the voice input means;
an input item count detection means for counting the total number of items necessary to control the device recognized in the current input one-time speech of the user by the voice recognition means
a reference input item count setting means for setting a reference value for the number of items identified from the current input one-time speech of the user based on a driving load on the user, wherein the reference value for the number of items is higher or lower than the actual number of items identified by the input item count detection means;
an input item count comparison means for comparing the total number of items detected by the input item count detection unit from the current input one-time speech with the reference value for the number of items set by the reference input item count setting unit;

a learning level determination means for determining a learning level in speech of the user based on a comparison result of the input item count comparison unit;

a response control means for controlling the response output from a response output means according to the learning level determined by the learning level determination means, wherein, if the determined learning level in speech of the user is high, the response output prompts the user to input at one-time a plurality of items necessary to control the device, and if the determined learning level in speech is low, the response output prompts the user to input items necessary to control the device one by one; and a device control means for controlling the device based on the user input.

* * * * *